Patented Dec. 8, 1931

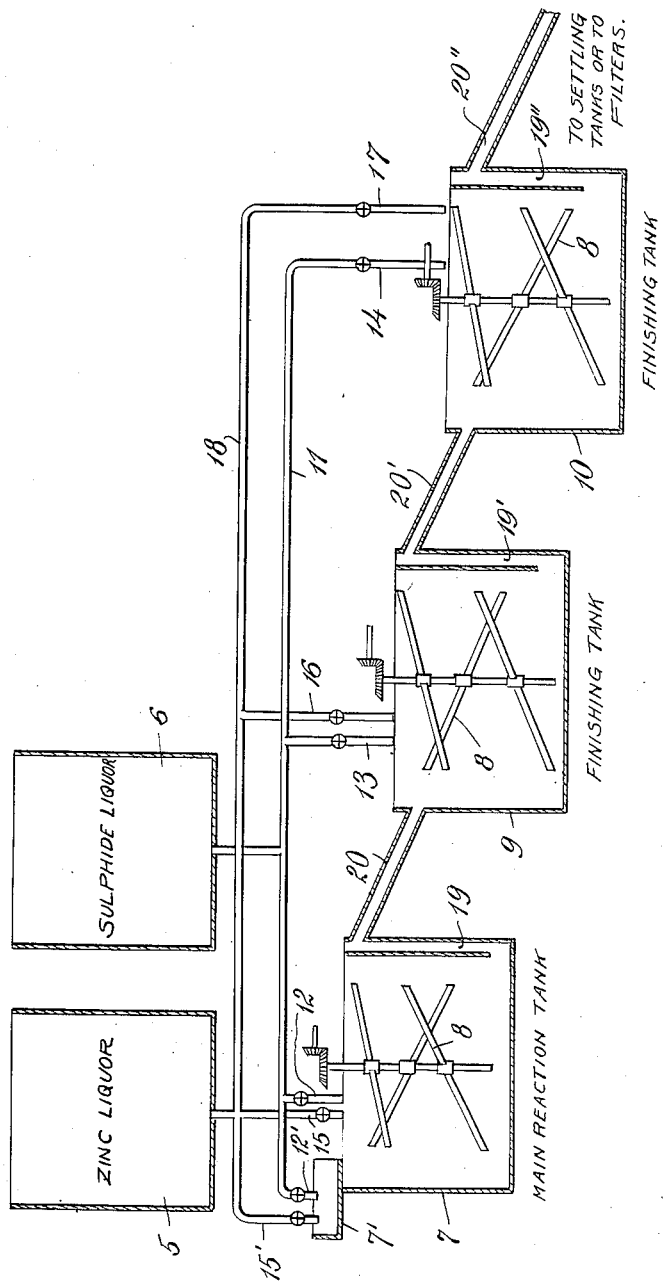

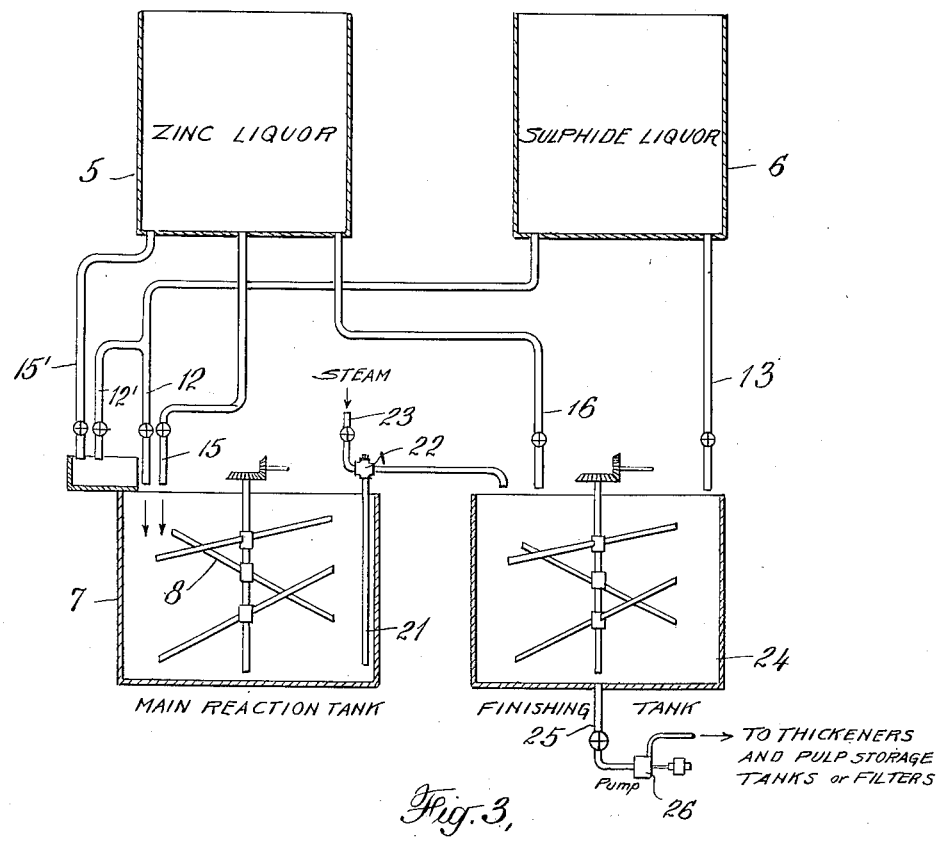
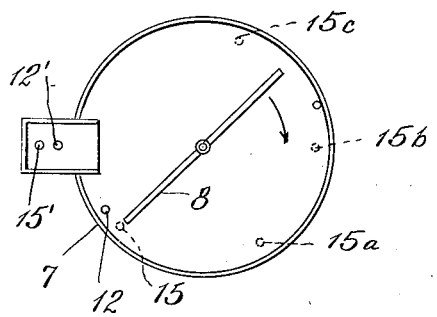

1,835,482

UNITED STATES PATENT OFFICE

EDMUND J. FLYNN AND WILLIAM C. HOOEY, OF PALMERTON, PENNSYLVANIA, ASSIGNORS TO THE NEW JERSEY ZINC COMPANY, OF NEW YORK, N. Y., A CORPORATION OF NEW JERSEY

MANUFACTURE OF ZINC SULPHIDE

Application filed February 16, 1929. Serial No. 340,380.

This invention relates to the manufacture of pigments and has for its object the provision of certain improvements in the manufacture of zinc sulphide for pigment purposes.

Crude zinc sulphide may be manufactured or prepared by mixing solutions of a zinc salt and a suitable sulphide to produce a precipitate of insoluble zinc sulphide. It has heretofore been customary practice to carry out this precipitation as a batch operation. Thus, according to some heretofore customary practices, a predetermined quantity of purified zinc chloride solution or liquor is introduced into a precipitating tank and then purified barium sulphide liquor is gradually added until a definite excess of barium sulphide is present. After the precipitation is complete, the precipitate is washed, filtered, dried and calcined, and the calcined product is ground, filtered, dried and disintegrated to produce the final pigment.

As a result of this heretofore customary practice, the conditions existing during the progress of the precipitation of a batch of zinc sulphide undergo constant and important changes, especially with respect to liquor concentrations, hydrogen ion concentration, slurry density, temperature, agitation, etc. For instance, if the precipitation is carried out with aqueous solutions of zinc chloride and barium sulphide of constant concentrations and with the gradual additions of the barium sulphide solution to the zinc chloride solution, as the precipitation of zinc sulphide proceeds the zinc chloride solution is progressively diluted, and, furthermore, there is a progressive addition of barium chloride in solution formed as a result of the reaction between the zinc chloride and barium sulphide. The precipitation starts in a relatively concentrated solution of pure zinc chloride and ends in a fairly strong solution of barium chloride.

The heretofore customary practice results in the production of zinc sulphide pigments having a number of undesirable characteristics or properties. The zinc sulphide in the precipitated slurry probably exists as a mixture of single sulphide particles and aggregates containing various numbers of single particles. The precipitate is non-uniform as regards the state of aggregation of the zinc sulphide. The precipitated zinc sulphide also exhibits a strong tendency to adsorb soluble salts from the precipitating liquors. These adsorbed compounds do not readily wash out and are not readily removed in the usual crude zinc sulphide washing operation. The calcined product is relatively hard, and, even after excessively long grinding, the product does not make a satisfactory paint pigment.

The present invention contemplates the provision of an improved process by means of which the aforementioned undesirable characteristics may be eliminated and a highly satisfactory zinc sulphide pigment may be produced. We have discovered that important advantages, with respect to both product and process, may be obtained by carrying out the precipitation of the crude zinc sulphide under substantially constant or uniform conditions of liquor concentrations, hydrogen ion concentration, slurry density, temperature, agitation, etc. We have found that these uniform conditions can be established and maintained by appropriately controlled continuous precipitation of the crude zinc sulphide, as distinguished from the heretofore customary batch operations.

According to the improved process of our invention a solution of a suitable zinc salt and a solution of a suitable sulphide are caused to flow concurrently and at substantially constant predetermined rates into a main reaction or precipitating tank. This tank is preferably equipped with an agitator of the paddle type for the purpose of keeping the contents well mixed. The material from the bottom of the tank containing the precipitated zinc sulphide is continuously withdrawn, and the slurry level in the tank is maintained substantially constant. We prefer to adjust the precipitating liquors to provide constant characteristics, and by regulating or fixing the rates of inflow of the two liquors, the rate of slurry withdrawal, and the rate of agitation, conditions in the precipitating tank remain substantially constant and precipitation under uniform conditions is achieved.

In carrying out the process of the invention, the conditions under which the precipitating liquors are introduced into a precipitating tank may be varied. If the sulphide and zinc solutions enter the precipitating tank at substantially the same point, precipitation of the zinc sulphide occurs in substantially the original concentration of the solutions. If, however, the zinc solution enters the precipitating tank at some distance from the sulphide solution the zinc solution may be diluted by the mother liquor of the slurry as it is swept around by the agitator to meet the incoming sulphide solution. In such cases the precipitation takes place with solutions more dilute than the original. The distance between the points at which the sulphide and zinc solutions are introduced into the precipitating tank may be varied in order to effect precipitation under varying conditions of concentration. Actual practice has shown that this method of controlling precipitating concentrations gives very positive results.

In plant practices of the invention, the mixing of the sulphide and zinc solutions and the precipitation of the greater part of the crude zinc sulphide take place continuously in one tank. Crude zinc sulphide slurry is continuously withdrawn from this mixing and precipitating tank at such a rate as to maintain a substantially constant liquid level in the tank. The slurry thus withdrawn from this mixing and precipitating tank is pumped or otherwise appropriately conveyed to one or more finishing tanks. The finishing tanks may be operated in a continuous manner similar to the operation of the main reaction or precipitating tank, or, the finishing operation may be carried out as a batch operation. Small additional quantities of the sulphide solution or the zinc solution or other desirable substances necessary to attain the desired end point of the precipitating reaction may be added to the slurry in the finishing tanks. In the course of the finishing operation, the crude zinc sulphide slurry is agitated, washed, thickened and filter pressed in the customary manner. All or practically all of the crude zinc sulphide may be precipitated in the first tank by the process of continuous precipitation. The remaining tanks are essentially for the purpose of balancing and adjusting the end point of the precipitation.

The practice of the improved method of our invention, as distinguished from heretofore customary practices, results in the production of:

(1) A zinc sulphide precipitate in which the zinc sulphide particles are present in more uniformly sized aggregates containing more nearly equal numbers of primary zinc sulphide particles;

(2) A zinc sulphide precipitate which in general settles more rapidly in the washing tanks, resulting in a higher capacity for any given washing system and a more complete removal of the precipitating liquor;

(3) A zinc sulphide precipitate which filters more readily after washing, producing a filter cake of lower moisture content and resulting in desired economies in filtering and drying;

(4) A relatively soft calcined product resulting in a saving of power and increased capacity of wet grinding units;

(5) A finished zinc sulphide product of superior pigment properties; and (6) A finished zinc sulphide product of superior hiding power.

In carrying out our improved method on a commercial scale we have found that satisfactory results may be obtained by utilizing a main reaction or precipitating tank 15 feet in diameter, and 6 feet deep, and equipped with a paddle type agitator running 7 to 8 revolutions per minute. In using solutions of zinc chloride and barium sulphide, we prefer to introduce these solutions into the precipitating tank at substantially the same point, that is, the pipes conveying the two solutions into the tank are approximately vertical and adjacent. The two solutions meet before they are diluted to an appreciable extent by admixture with the mother liquor of the slurry. We prefer to use zinc chloride solution of 35–45° Bé. at 65–75° C., and barium sulphide solution of 12–15° Bé. at 65–75° C. The liquor streams are run into the tank in approximately the proportions required by the reaction:

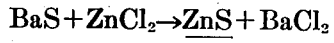

$$BaS + ZnCl_2 \rightarrow ZnS + BaCl_2$$

The rate of flow of the streams is such as to fill the tank in about an hour.

The relative rates of flow of the zinc chloride and barium sulphide liquors may be controlled in various ways, such as by volumetric measurement, weight measurement, etc. We have found it practical to control these rates of flow by frequent tests of the slurry in the main reaction tank. This slurry is sampled either at some point well removed from the liquor inlets or as it is withdrawn from the tank. This sample is filtered, and tested (a) by adding a few drops of potassium ferrocyanide solution to about 10 c.c. of filtrate (a white precipitate shows the presence of zinc in solution) or (b) by adding a few drops of alcoholic solution of phenolphthalein to 10 c.c. of filtrate (a pink coloration indicates the presence of an excess of barium sulphide liquor, or of barium hydrate). Or the filtrate may be analyzed for zinc or for sulphide or hydrate by commonly known methods.

In our practice we prefer to maintain a faint trace of dissolved zinc in the main reaction tank slurry, and consequently we regulate the two liquor streams so that test (a) noted above, always shows the presence of a faint trace of zinc in the filtrate. This method of regulation eliminates the necessity for any volumetric or gravimetric control of the quantities of the liquors run into the tank.

This slurry continuously withdrawn from the main reaction tank is led either by a launder or by a pump and pipe line into another similar tank, and the slurry continuously withdrawn from this second tank may be led into a third, and then into a fourth, etc., if desired. In these tanks small additional quantities of barium sulphide liquor and, if necessary, barium hydrate are added, so that the slurry continuously withdrawn from the last tank of the series contains the desired excess of and ratio between barium sulphhydrate and hydrate. The slurry from the last tank of the series is pumped or otherwise led to the washing system for the removal of soluble salts, washed, adjusted for the desired excess and ratio between barium sulphhydrate and hydrate, and subsequently processed as described in copending application, Serial No. 199,405, filed June 16, 1927.

The invention will be better understood from a consideration of the following description, taken in conjunction with the accompanying drawings, in which:

Fig. 1 shows an arrangement of apparatus adapted for the practice of the invention;

Fig. 2 is a diagrammatic illustration of a modified arrangement of the finishing tank; and Fig. 3 is a diagrammatic plan of the main reaction or precipitating tank.

The apparatus illustrated in Fig. 1 of the drawings comprises a storage and supply tank 5 for the purified zinc liquor, and a storage and supply tank 6 for the purified sulphide liquor. The main reaction or mixing tank 7 is positioned below the storage tanks 5 and 6 and is provided with a rotatable paddle agitator 8. The finishing tanks 9 and 10 are at respectively lower levels than the tank 7 and each is provided with a rotary agitator 8.

The sulphide liquor flows from the tank 6 to a pipe line 11 having valve-controlled branches 12, 12', 13 and 14 for feeding sulphide liquor to the tank 7, launder 7', and tanks 9 and 10 respectively. Similarly, the tank 7, launder 7', and tanks 9 and 10 are adapted to receive zinc liquor through valve-controlled branches 15, 15', 16 and 17, respectively, of a pipe line 18 leading from the tank 5.

As shown in Fig. 3, the branch pipe 12 is relatively stationary, whereas the branch pipe 15 is movable about the inner periphery of the tank 7, whereby the zinc liquor may be introduced into the tank 7 at any desired point around the inner periphery thereof. In Fig. 3 of the drawings four illustrative positions of the pipe 15 are indicated by reference numerals 15, 15a, 15b, and 15c.

Zinc liquor flows continuously through the branch pipe 12 into the main reaction tank 7, or through branch pipe 12' into the launder 7'. Similarly, sulphide liquor flows continuously through the branch pipe 15 into the tank 7, or through the branch pipe 15' into the launder 7'. The crude zinc sulphide slurry in the tank 7 is agitated and mixed by the continuously rotating paddle stirrer 8. The liquor or slurry level in the tank 7 is always kept at a constant point, nearly tank-full.

Slurry is continuously withdrawn by gravity from the tank 7 through an uptake well 19 into an overflow launder 20 connecting with the first finishing tank 9. In the tank 9, the crude zinc sulphide slurry is continuously agitated and mixed by the rotating paddle stirrer 8. Appropriate small amounts of sulphide liquor are introduced into the tank through the branch 13 until the desired endpoint is reached or closely approximated. Crude slurry is continuously withdrawn by gravity from the tank 9 through an uptake well 19' into an overflow launder 20' connecting with the second finishing tank 10. In the tank 10 the crude slurry is subjected to the same finishing treatment as in the tank 9, and the endpoint of the precipitating reaction is definitely and accurately controlled.

From the tank 10, the crude zinc sulphide slurry is withdrawn by gravity through an uptake well 19" into an overflow launder 20" and conveyed to washing or thickening tanks. The thickened slurry is then filtered in accordance with the heretofore customary practice. The desired endpoint of the precipitating reaction will ordinarily be obtained in the finishing tanks 9 and 10 by the addition thereto of small amounts of sulphide liquor. Provision is made, however, for the introduction of zinc liquor to the tanks 9 and 10, in the event that this is desirable or necessary in the finishing operation.

A slightly modified arrangement of the finishing tanks is illustrated in Fig. 2 of the drawings. In the arrangement of Fig. 1, the various tanks are positioned at respectively different levels, and the flow of the slurry from the main reaction tank to and through the finishing tanks is effected by gravity. In the arrangement of Fig. 2, the main reaction tank and the finishing tanks are positioned at substantially the same level. It is therefore necessary to pump or otherwise mechanically withdraw the slurry from each tank. To this end, the main reaction tank 7 is provided with an outlet pipe 21 having its lower or inlet end near the bottom of the tank. The top of the pipe 21 connects with a steam ejector 22 having a valve-controlled steam supply pipe 23. Slurry is withdrawn from the main reaction tank by the ejector 22 and introduced into a finishing tank 24. In accordance with the principles of the present invention, the rates of introduction of sulphide solution and zinc solution into the tank 7 and the rate of withdrawal of slurry from this tank are so regulated as to maintain the liquor concentrations of the slurry in the tank substantially constant.

The finishing tank 24 has a valve controlled outlet 25 in the bottom thereof connected to a pump 26. When the tank 24 has been substantially filled with crude slurry withdrawn from the tank 7, it is finished off in substantially the manner heretofore customary in batch operations. In the meantime, the slurry withdrawn from the tank 7 is introduced into another finishing tank. From the finishing tanks 24 the crude zinc sulphide slurry is conveyed to washing tanks, thickeners, storage tanks or the like, and subsequently to filters in the heretofore customary manner.

When the sulphide and zinc liquor supply pipes occupy the position represented by reference numerals 12 and 15 of Fig. 3, and when the sulphide and zinc liquors are admitted through the pipes 12' and 15', the zinc solution comes into contact with the sulphide solution immediately, without having had an opportunity of becoming appreciably diluted or dispersed by admixture with the precipitate slurry or crude zinc sulphide pulp. Precipitation takes place in concentrations of solutions closely approaching those existing in the supply tanks 5 and 6. Under these conditions the crude zinc sulphide settles more rapidly and has a higher hiding power than crude zinc sulphide made by the heretofore customary batch operation. In the process of the invention, the ultimate particles of the crude zinc sulphide are in uniformly sized aggregates, whereas in the batch operation the crude zinc sulphide contains aggregates made up of widely varying numbers of particles. The calcined product, made in accordance with the invention, is soft and possesses unusually high hiding power, and when made into paint is exceptionally smooth and glossy.

When the zinc solution enters the tank 7 at the point indicated by reference numeral 15c of Fig. 3, there is considerable opportunity for it to be diluted and dispersed by admixture with the crude zinc sulphide slurry before the agitator swirl carries it around to the point where it comes into contact with the sulphide liquor. In this case precipitation takes place in very much more dilute solutions than when the zinc liquor enters at 15. When precipitated under those conditions, the crude zinc sulphide settles even more rapidly and has even higher hiding power than when the zinc liquor enters at 15. The ultimate particles of the crude zinc sulphide are uniformly aggregated as before, but the aggregates are larger. The calcined product is extremely soft, but has less hiding power and when made into paint is not so smooth and glossy as when the zinc solution is introduced at 15.

As the point of introduction of the zinc solution into the tank 7 is adjusted from 15 or 15' through 15a, and 15b to 15c, the various qualities of the crude and finished zinc sulphides show a progressive change from those of the two extreme cases just discussed.

Throughout this specification and the appended claims, we have used the expression "liquor concentrations" to designate the concentrations of sulphide, zinc compound and other water-soluble compounds in the liquor or medium in which the sulphide and zinc compound are brought into reactive relations with one another. While we prefer that this medium shall consist of a substantial body of crude zinc sulphide slurry, wide variations in the volume of this body of slurry are permissible without departing from the principles of the invention.

We claim:

1. The improvement in the manufacture of pigment zinc sulphide which comprises continuously introducing barium sulphide solution and zinc chloride solution into a body of crude zinc sulphide slurry of substantially constant liquor concentration, the points of introduction of such solutions into the slurry being so spaced as to bring the solutions into reactive relationship with one another at predetermined liquor concentrations.

2. The improvement in the manufacture of pigment zinc sulphide which comprises simultaneously and continuously flowing aqueous solutions of barium sulphide and zinc chloride into a reaction chamber, providing a crude zinc sulphide slurry in the reaction chamber having a liquor concentration adapted to promote the formation of substantially uniformly sized aggregates of the ultimate zinc sulphide particles, then maintaining said slurry of crude zinc sulphide at said predetermined liquor concentration in the chamber as further amounts of barium sulphide and zinc chloride solutions are brought into reactive relation, keeping the reaction mixture in the chamber in a state of continuous agitation adapted to provide a substantially complete reaction between the zinc sulphate and barium sulphide solution, and continuously withdrawing slurry from the reaction chamber, the said slurry being withdrawn from the reaction chamber at or near the opposite end at which the reacting solutions are first introduced into the chamber.

3. The improvement in the manufacture of pigment zinc sulphide which comprises introducing simultaneously and continuously aqueous solutions of barium sulphide and zinc chloride in a reaction chamber, providing a crude zinc sulphide slurry in the reaction chamber having a liquor concentration adapted to promote the formation of substantially uniformly sized aggregates of the ultimate zinc sulphide particles, then maintaining said slurry of crude zinc sulphide at said predetermined liquor concentration in the chamber as further amounts of barium sulphide and zinc chloride solutions are brought into reactive relation, and continuously withdrawing regulated amounts of slurry from said reaction chamber.

4. The improvement in the manufacture of pigment zinc sulphide which comprises continuously introducing barium sulphide solution and zinc chloride solution into a body of crude zinc sulphide pulp, continuously withdrawing pulp from said body thereof, and regulating the rates of introduction of said solution and the rate of withdrawal of said pulp so as to maintain the liquor concentration of said body of pulp substantially constant, said liquor concentartion being adapted to promote the formation of substantially uniformly sized aggregates of the ultimate zinc sulphide particles.

5. The improvement in the manufacture of pigment zinc sulphide which comprises continuously introducing barium sulphide solution and zinc chloride solution concurrently into a body of crude zinc sulphide pulp, and continuously maintaining the liquor concentrations of said body of pulp substantially constant, said liquor concentration being adapted to promote the formation of substantially uniformly sized aggregates of the ultimate zinc sulphide particles.

6. The improvement in the manufacture of pigment zinc sulphide which comprises simultaneously and continuously introducing solutions of barium sulphide and zinc chloride into a reaction chamber, regulating the flow of the solutions of barium sulphide and zinc chloride into a reaction chamber so as to provide and maintain a slurry of crude zinc sulphide of substantially unchanging liquor concentrations, continuously withdrawing crude zinc sulphide slurry from the reaction chamber, and treating the crude zinc sulphide slurry so withdrawn with the reacting solutions to obtain a predetermined end point of the precipitation reaction.

7. The improvement in the manufacture of pigment zinc sulphide which comprises simultaneously and continuously introducing solutions of barium sulphide and zinc chloride into a reaction chamber, regulating the flow of the solutions of barium sulphide and zinc chloride into the reaction chamber so as to provide and maintain a slurry of crude zinc sulphide of substantially unchanging liquor concentrations, continuously withdrawing crude zinc sulphide slurry from the reaction chamber, and treating the crude zinc sulphide slurry so withdrawn to obtain a predetermined end point of the precipitation reaction.

8. The improvement in the manufacture of pigment zinc sulphide which comprises simultaneously and continuously introducing solutions of barium sulphide and zinc chloride into a reaction chamber, regulating the flow of the solutions of barium sulphide and zinc chloride into the reaction chamber so as to provide and maintain a slurry of crude zinc sulphide of substantially unchanging liquor concentrations, continuously withdrawing crude zinc sulphide slurry from the reaction chamber to a finishing tank, treating the crude zinc sulphide slurry in the finishing tank to obtain a predetermined end point of the precipitating reaction, and continuously withdrawing treated crude zinc sulphide slurry from the finishing tank.

9. The improvement in the manufacture of pigment zinc sulphide which comprises simultaneously and continuously introducing solutions of barium sulphide and zinc chloride into a mixing and precipitation tank, continuously withdrawing crude zinc sulphide slurry from the mixing and precipitation tank, and treating the crude zinc sulphide so withdrawn to obtain a predetermined end point of the precipitation reaction.

10. The improvement in the manufacture of pigment zinc sulphide which comprises concurrently introducing solutions of barium sulphide and zinc chloride into reactive relation with one another in a medium of substantially unchanging liquor concentration, and then treating the resulting crude zinc sulphide slurry to obtain a predetermined end point of the precipitation reaction.

11. The improvement in the manufacture of pigment zinc sulphide which comprises continuously introducing barium sulphide solution and zinc chloride solution into a body of crude zinc sulphide pulp, continuously withdrawing pulp from said body thereof, regulating the rates of introduction of said solutions and the rate of withdrawal of said pulp so as to maintain the liquor concentrations of said body of pulp substantially constant, introducing the pulp so withdrawn into a body of crude zinc sulphide pulp, and treating the pulp so withdrawn to obtain a predetermined end point of the precipitation reaction.

In testimony whereof we affix our signatures.

EDMUND J. FLYNN.
WILLIAM C. HOOEY.